April 16, 1957  C. W. HOSPELHORN  2,788,660
APPARATUS FOR PRESETTING PARACHUTE RELEASE ASSEMBLIES
Filed Sept. 16, 1954
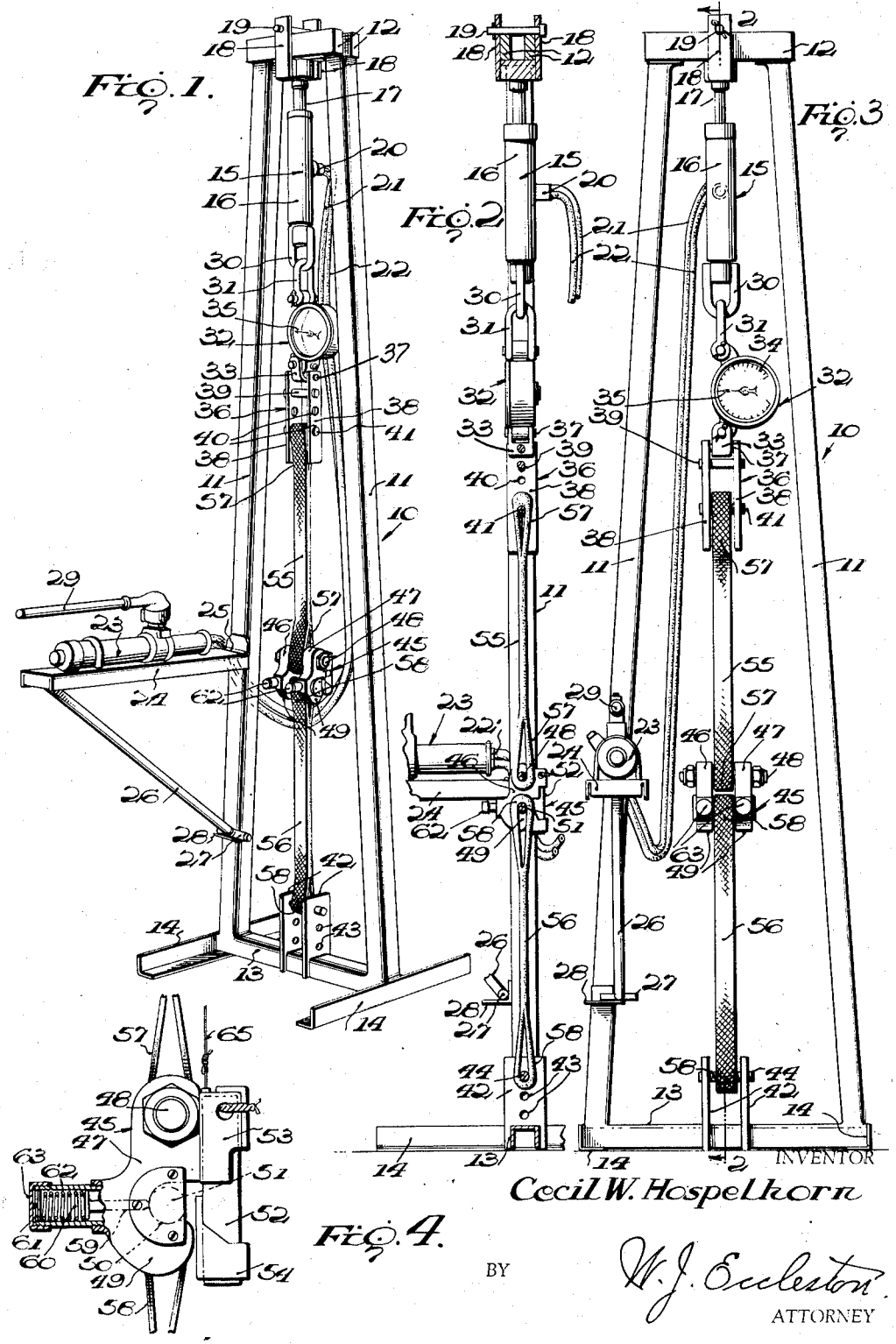
INVENTOR
Cecil W. Hospelhorn
BY W. J. Eccleston
ATTORNEY

United States Patent Office 2,788,660
Patented Apr. 16, 1957

2,788,660

APPARATUS FOR PRESETTING PARACHUTE RELEASE ASSEMBLIES

Cecil W. Hospelhorn, Petersburg, Va., assignor to the United States of America as represented by the Secretary of the Army Application September 16, 1954, Serial No. 456,640

3 Claims. (Cl. 73—141)

(Granted under Title 35, U. S. Code (1952), sec. 266)

The invention described herein, if patented, may be manufactured and used by or for the Government for governmental purposes, without the payment to me of any royalty thereon.

The present invention relates to an apparatus for presetting parachute release assemblies.

The customary procedure for presetting jaw type parachute release assemblies is to employ a mobile crane for lifting the release assembly while it is attached to a given load. This load may be an actual piece of equipment, later to be dropped by parachute, or a dummy load of a known weight, simulating the actual load.

The release assembly and load are lifted by the crane, and while suspended, the release spring adjusting screws of the assembly are turned until the suspension pin is properly balanced within the hooks or jaws of the assembly. The load and release assembly are now lowered to the ground, and the adjusted or pre-set release assembly is disconnected from the crane and load and is ready for connection with a parachute and actual load or cargo to be dropped from an airplane.

The above procedure is quite laborious and time consuming, and requires the use of a cumbersome and expensive crane, as well as dummy loads or actual loads (cargo) which take up much space in a warehouse, or the like. In addition, the presetting of the release assembly is accomplished in a rather haphazard manner, the mechanic relying largely on "feel" to adjust the release spring screws, while the release assembly is under actual load.

My apparatus is designed to completely overcome all of the above mentioned deficiencies, by providing simplified and highly compact means for accurately and scientifically presetting the jaw-type parachute release assemblies in the shortest possible time, and with a minimum of labor. My apparatus is highly compact, and occupies very little floor space, and it eliminates entirely, the need for the lifting crane and dummy or actual cargo loads, referred to above. The parachute release assembly is securely held against movement in the apparatus, while controlled tension simulating an actual load is applied to the same hydraulically. This simulated load is reflected by a graduated force measuring instrument which the mechanic may observe while presetting the release assembly. The load may be reduced at will, to test the accuracy of adjustment of the release assembly, and to assure that the suspension pin will be ejected when the load is reduced. The same apparatus is usable for presetting the release assemblies to function with a wide range of loads, and no actual or dummy loads are required, as previously stated.

A single apparatus in accordance with the invention is capable of presetting a large number of release assemblies in the shortest possible time, with a minimum of labor, and with the highest degree of accuracy. The entire apparatus occupies very little space, and requires little or no maintenance. The method of presetting the release assemblies by the use of the apparatus can easily be practiced by one unskilled workman or mechanic, and without the use of any special tools.

When the release assembly has been preset or adjusted in accordance with my apparatus, it may be quickly separated from the apparatus as a unit and carried to the actual load or cargo, to which it is attached, along with the parachute to be used for the air drop.

The principal objects of the invention now having been made clear by the above discussion, it is believed that other objects and advantages of the invention will become apparent during the course of the following description:

In the accompanying drawings, forming a part of this application, and in which like numerals are employed to designate like parts throughout the same, Figure 1 is a perspective view of apparatus in accordance with my invention, and showing the use of the same in the practice of my method, Figure 2 is a central vertical longitudinal section taken on line 2—2 of Figure 3, parts in elevation, Figure 3 is a front side elevation of the apparatus, and, Figure 4 is an enlarged fragmentary side elevation of a parachute release assembly to be preset or adjusted by my apparatus and method.

In the drawings, wherein for the purpose of illustration is shown a preferred embodiment of the invention, the numeral 10 designates generally a frame or supporting structure of the apparatus, including a pair of spaced upright frame members 11 or bars, which preferably converge upwardly, somewhat, as shown. The upright bars 11 are rigidly connected at their tops by short horizontal, transverse bars 12, rigidly secured thereto by welding, or the like. The lower ends of the bars 11 are similarly rigidly connected by a horizontal transverse bar 13, welded or otherwise rigidly secured thereto. Horizontal feet 14 or support members for the frame 10 are provided, and these extend forwardly and rearwardly of the frame for considerable distances to render the upright frame stable. The entire frame 10 is sturdy and rigid, and may be formed of structural steel, or the like.

Suspended from the upper horizontal frame bars 12 and arranged between the uprights 11 is a conventional hydraulic, push-pull jack or ram 15, including a vertically movable cylinder 16 and relatively stationary piston rod 17. The upper end of the piston rod 17 has rigidly secured to it a U-shaped suspension yoke, including arms 18, which receive the bars 12 between them, as shown. The arms 18 extend somewhat above the bars 12, and are apertured near their upper ends for the reception of a removable bolt or pin 19, which rests upon the tops of bars 12, and extends transversely thereof.

The jack cylinder 16 is provided near its longitudinal center with a hydraulic fluid inlet and outlet fitting 20, integral therewith, and connected with fluid inlet and outlet hoses 21 and 22, which are flexible. The hoses 21 and 22 extend downwardly for connection with the fluid inlet and outlet 22' of a conventional hydraulic jack pump 23, suitably rigidly mounted upon a forwardly projecting horizontal support arm 24, having its rear end hingedly secured at 25 to the forward side of one of the uprights 11, a substantial distance above the bottom of the frame 10. A diagonal brace bar 26 has its upper end hinged to the arm 24, near the forward end of the latter, and the lower end of the brace bar 26 carries a short transverse pin 27, or the like, rigidly secured thereto, for engagement with a fixed projection or stop 28, rigid on the adjacent upright 11, a substantial distance below the hinge 25. The pin 27 may be disengaged from the stop 28, to permit the arm 24 and jack pump 23 to swing downwardly to a vertical position forwardly of the upright frame member 11, when desired.

The jack jump 23 has a vertically swingable operating handle 29 operatively connected therewith, as shown, and the jack jump is hydraulically interconnected with the push-pull jack or ram 15 in a conventional manner through the hoses 21 and 22.

The hydraulic jack 15 and pump 23 are entirely conventional, as stated, and are sold as a unit by Hein Weiner Corporation, Model HC 700. Any other similar jack and jack pump may of course be substituted for the particular jack and jack pump shown and specified above.

Rigidly secured to the lower end of the jack cylinder 16 is a U-shaped attaching element or loop 30, having a chain link connection with a clevis 31 of a conventional tensile force measuring dynamometer 32, having a lower end attaching part 33. The dynamometer 32 has a graduated tensile force indicating scale 34, for coaction with a movable pointer 35, and the dynamometer preferably has a 10,000 pounds capacity. The dynamometer scale 34 and pointer 35 will indicate in pounds the pull or tensile force exerted upon the clevis 31 and part 33 of the dynamometer, up to 10,000 pounds. The dynamometer 32 is preferably of the type presently manufactured by W. C. Dillon & Company, Inc., Chicago, Illinois, although any similar dynamometer may be used, if preferred.

An attaching block 36 is pivotally secured near its upper end to the dynamometer part 33 by a pin 37, and the attaching block 36 depends from the dynamometer, as shown. The attaching block 36 embodies a pair of vertical side plates 38, rigidly connected by a transverse element or pin 39. The plates 38 are apertured at 40, for receiving and supporting a removable horizontal suspension pin 41 at the desired elevation.

A pair of upstanding plates 42 are rigidly secured to the horizontal frame member 13, near its longitudinal center, and directly below the plates 38. The plates 42 have pairs of vertically spaced aligned openings 43, for receiving at a desired elevation, a removable horizontal attaching pin 44, similar to the pin 41.

The jaw-type parachute release assembly 45, to be preset or adjusted by the use of my apparatus is the identical device disclosed in United States Patent 2,616,748 to Hight, and the disclosure in that patent is hereby incorporated in and made a part of this application.

The parachute release assembly 45 embodies side body portions 46 and 47, rigidly connected near their tops by a transverse cross-pin 48. The body portions 46 and 47 terminate at their lower ends, in hook-like extensions 49, forming shallow, upwardly opening concave seats 50 for a releasable transverse horizontal suspension pin 51. The suspension pin 51 is normally held within the confines of the hook extensions 49, by releasable securing bars 52, held in place by stationary and pivoted jaws 53 and 54, as fully set forth in Patent 2,616,748, referred to above.

The release assembly 45 is connected with the apparatus of the present invention by upper and lower flexible straps or webs 55 and 56, forming permanent parts of the parachute release assembly 45. The upper strap 55 has attaching loops 57 at its upper and lower ends, connected with the pins 41 and 48, respectively, as shown in the drawings. The lower strap 56 is correspondingly provided at its ends with integral attaching loops 58, connected with the pins 51 and 44, as shown. The straps 55 and 56 extend vertically, as shown, and bodily support the release assembly 45 in a substantially stationary condition, when under tension in the apparatus.

The suspension pin 51 of the parachute release assembly is acted upon by a pair of ejection plungers or pins 59, urged toward one side of the pin 51 by coil springs 60, which may have their tensions adjusted by adjusting screws 61. The plungers 59, springs 60 and adjusting screws 61 are housed within cylinders 62, which are rigidly secured to the body portion 46 and 47 of the parachute release assembly 45. The cylinders 62 have removable caps 63, permitting ready access to the suspension pin adjusting screws 61.

The spring loaded plungers 59 engage the inner side of the suspension pin 51 near its ends and tend to urge the pin 51 out of engagement with the hook extensions 49 and concave seats 50. The bars 52, as long as they are held in place by the jaws 54, prevent the suspension pin 51 from passing through the open sides of the hook extensions 49, and this condition will prevail at all times, until the cargo having the parachute release assembly 45 connected thereto is actually dropped from the airplane.

When tension is placed upon the straps 55 and 56, the suspension pin 51 will be held against the concave seat 50 by the strap 56; and so long as the downward component of force on the pin 51 exerted by strap 56 is greater than the horizontal component of force exerted by the ejection pins 59, the suspension pin 51 will remain seated within the hook extensions 49. Likewise, whenever the horizontal component of force on the suspension pin 51 through the ejection plungers 59 exceeds the downward pull on the pin 51 by strap 56, the suspension pin 51 will tend to be ejected from the hook extensions 49, and separated from the assembly 45.

The apparatus is used for presetting the parachute release assembly 45, as follows:

The straps 55 and 56 have their loops 57 and 58 connected with the removable pins 51 and 44 of the apparatus, as shown in Figure 1. The release assembly 45 is permanently connected with the other loops 57 and 58 of the straps, as shown, and the straps bodily support the release assembly.

The operator now applies the desired load upon the release assembly 45, which will simulate the actual load of the cargo to be dropped by parachute in association with the release assembly. The operator swings or oscillates the pump handle 29 for supplying fluid pressure to the jack or ram 15. The ram cylinder 16 travels upwardly upon the piston rod 17, and applies tension to the straps 55 and 56 through the load measuring dynamometer 32. The operator observes the scale 34 and pointer 35 of the dynamometer until the desired simulated load in tension has been applied to the straps 55 and 56 and the release assembly 45. When the desired load is achieved, the pumping with the handle 29 is stopped, and the apparatus will maintain the simulated load upon the release assembly.

The screw caps 63 are now removed from the cylinders 62, and the screws 61 are adjusted for regulating the tension of the coil springs 60. The screws 61 are turned for increasing the tension of the springs 60, until the pins or plungers 59 exert sufficient pressure upon the inner side of the suspension pin 51 to cause the same to be unseated from the concave seat 50. The pin 51 cannot actually completely leave the seat 50, since the jaws 54 holding the bars 52 prevent this, but the pin 51 can be caused to move into engagement with the inner sides of the jaws 54 and partially disengage the seat 50 to the hook extensions 49. The operator may then reduce the tension on the springs 60 slightly, by turning the adjusting screws 61 in the opposite direction, so that the suspension pin 51 is delicately balanced on the concave seat 50 while the established simulated load is still applied to the straps 55 and 56, and visible upon the scale of the dynamometer 32.

When the above presetting or adjusting of the unit 45 is completed, the screw caps 63 are re-applied to the cylinders 62, and the pressure in the jack cylinder 16 is relieved so that the tension on the straps 55 and 56 is reduced to zero. The pins 41 and 44 are now removed, and the properly preset parachute release assembly 45, including the straps 55 and 56 is removed from the apparatus.

The release assembly 45 is now ready for connection with the actual load to be dropped subsequently from an airplane and with the parachute. The upper strap 55 is connected with the parachute, and the lower strap 56 is connected with the actual load or cargo. When there is no load upon the adjusted or preset release assembly 45, the pins 59 will constantly tend to eject the suspension pin 51 from the seat 50, but the jaws 54 will prevent this.

When the load is subsequently dropped by parachute from the airplane, and the static line 65 to the airplane causes the jaws 54 to swing to their open positions, in accordance with the teachings of Patent 2,616,748, there will be nothing to obstruct or interfere with the ejection of the pin 51 from the seat 50, under the influence of the pins 59. However, at the time that the jaws 54 swing open, the actual load of the cargo is upon the release assembly 45 through the medium of the straps 55 and 60, and this load is the same as the simulated load established with the apparatus 10. The actual load upon the suspension pin 51 will hold the suspension pin seated upon the seat 50 and overcome the force of the ejection pins 59 during the descent of the cargo to the ground. However, as soon as the cargo strikes the ground and the load upon the suspension pin 51 is reduced, the pins 59 will instantly eject the suspension pin 51 from the hook extensions 49, and disconnect the strap 56 from the release assembly 45. This will disconnect the parachute from the cargo, so that wind cannot cause the parachute to drag the load along the ground or upset it.

It is thus seen that my apparatus allows accurate and efficient presetting of the parachute release assembly 45 prior to its connection with the actual cargo to be dropped from the airplane. The presetting of the release assembly is accomplished without the use of dummy loads or actual loads, and without the use of a crane. Accordingly, a great saving of space, time and labor is effected with the use of my apparatus, and a large number of parachute release assemblies may be preset in a minimum time by means of a single apparatus in accordance with the invention.

It is to be understood that the form of the invention, herewith shown and described is to be taken as a preferred example of the same, and that various changes in the shape, size and arrangement of parts may be resorted to, without departing from the spirit of the invention or scope of the subjoined claims.

I claim:

1. Apparatus for use in presetting a parachute release assembly comprising an upstanding frame including a pair of spaced uprights, a cross bar connecting the tops of the uprights, a cross bar connecting the uprights near their lower ends, a yoke suspended from the first-named cross bar, a piston rod dependingly secured to said yoke, a vertically movable hydraulic cylinder operatively connected with said piston rod and depending therefrom, fluid pressure operated means connected with said cylinder to elevate and lower the same, a tension measuring instrument connected with the lower end of said cylinder, means forming a first detachable connection between the parachute release assembly and said instrument, and means forming a second detachable connection between the parachute release assembly and the second named cross bar of the frame.

2. Apparatus for use in presetting parachute release assemblies comprising an upstanding frame, fluid pressure operated means connected with said frame near the top of the frame for exerting upward pull upon the parachute release assembly, a tension dynamometer dependingly secured to said means, a pair of plates dependingly secured to the dynamometer, a transverse suspension pin detachably connected with said plates and adapted to receive an upper strap of the parachute release assembly, a pair of upstanding plates secured to the frame near its bottom, a transverse pin detachably secured to the last-named plates and adapted to receive a lower strap of the parachute release assembly, and manually operated means for supplying fluid under pressure to said fluid pressure operated means.

3. Apparatus for use in presetting a parachute release assembly comprising an upstanding frame including a pair of spaced uprights, cross bars connecting the uprights near their upper and lower ends, a vertically movable fluid pressure operated pull device secured to one of said cross bars, a tension measuring instrument connected with said pull device, means for detachably connecting the parachute release assembly with the other of said cross bars and with said instrument, a support member carried by said upstanding frame and projecting beyond one side of the same, and manually operated fluid pressure pump means mounted upon the support member and operatively connected with said pull device for actuating the latter.

References Cited in the file of this patent

UNITED STATES PATENTS

| | | |
|---|---|---|
| 2,303,621 | Donnelly | Dec. 1, 1942 |
| 2,390,802 | Mars | Dec. 11, 1945 |
| 2,477,854 | Baker | Aug. 2, 1949 |
| 2,685,794 | Hall | Aug. 10, 1954 |